US008705200B2

(12) United States Patent
Manes et al.

(10) Patent No.: US 8,705,200 B2
(45) Date of Patent: Apr. 22, 2014

(54) MAGAZINE LATCH FOR A STORAGE LIBRARY

(75) Inventors: Joseph Paul Manes, Arvada, CO (US); Donald Robert Manes, Arvada, CO (US)

(73) Assignee: Oracle International Corporation, Redwood City, CA (US)

( * ) Notice: Subject to any disclaimer, the term of this patent is extended or adjusted under 35 U.S.C. 154(b) by 130 days.

(21) Appl. No.: 13/482,809

(22) Filed: May 29, 2012

(65) Prior Publication Data

US 2013/0320827 A1 Dec. 5, 2013

(51) Int. Cl.
*G11B 15/68* (2006.01)

(52) U.S. Cl.
USPC ........................................................ 360/92.1

(58) Field of Classification Search
CPC .. G11B 15/68; G11B 15/685; G11B 15/6885; G11B 15/6805; G11B 15/6835
USPC ............................ 360/92.1; 720/600; 361/679
See application file for complete search history.

(56) References Cited

U.S. PATENT DOCUMENTS

| 6,771,457 B2 * | 8/2004 | Flaherty et al. ............. 360/92.1 |
| 6,943,982 B2 * | 9/2005 | Flaherty et al. ............. 360/92.1 |
| 7,777,986 B2 * | 8/2010 | Barkley et al. .............. 360/92.1 |

* cited by examiner

*Primary Examiner* — Allen T Cao
(74) *Attorney, Agent, or Firm* — Marsh Fischmann & Breyfogle LLP; Daniel J. Sherwinter

(57) ABSTRACT

Embodiments include systems and methods for securing a magazine in a housing using a latching system. Embodiments operate in context of a storage library having removable magazines that store data cartridges. For example, a floating, two-part latching system operates in either an operable state or an unlatched state. The latching system includes a setter and a latch, where the latch is configured to float on the setter and to be biased into a latched position. When the setter is in a first position, it permits the latch to float between at least a fully latched position and a fully unlatched position. When the setter is moved to a second position, it moves the latch into the fully unlatched position and restricts the latch from moving into the latched position.

20 Claims, 11 Drawing Sheets

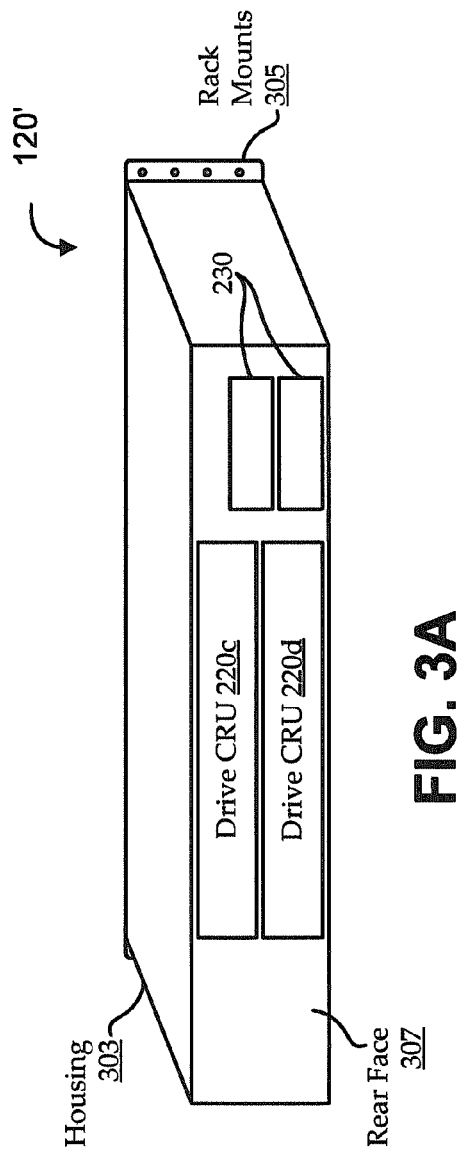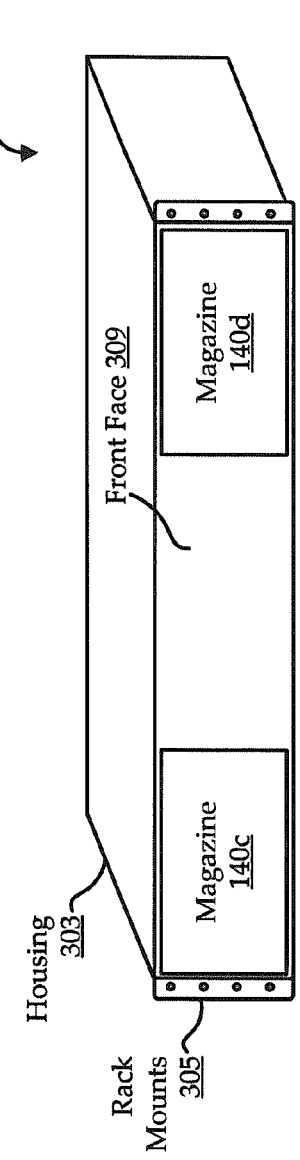
FIG. 3A
FIG. 3B

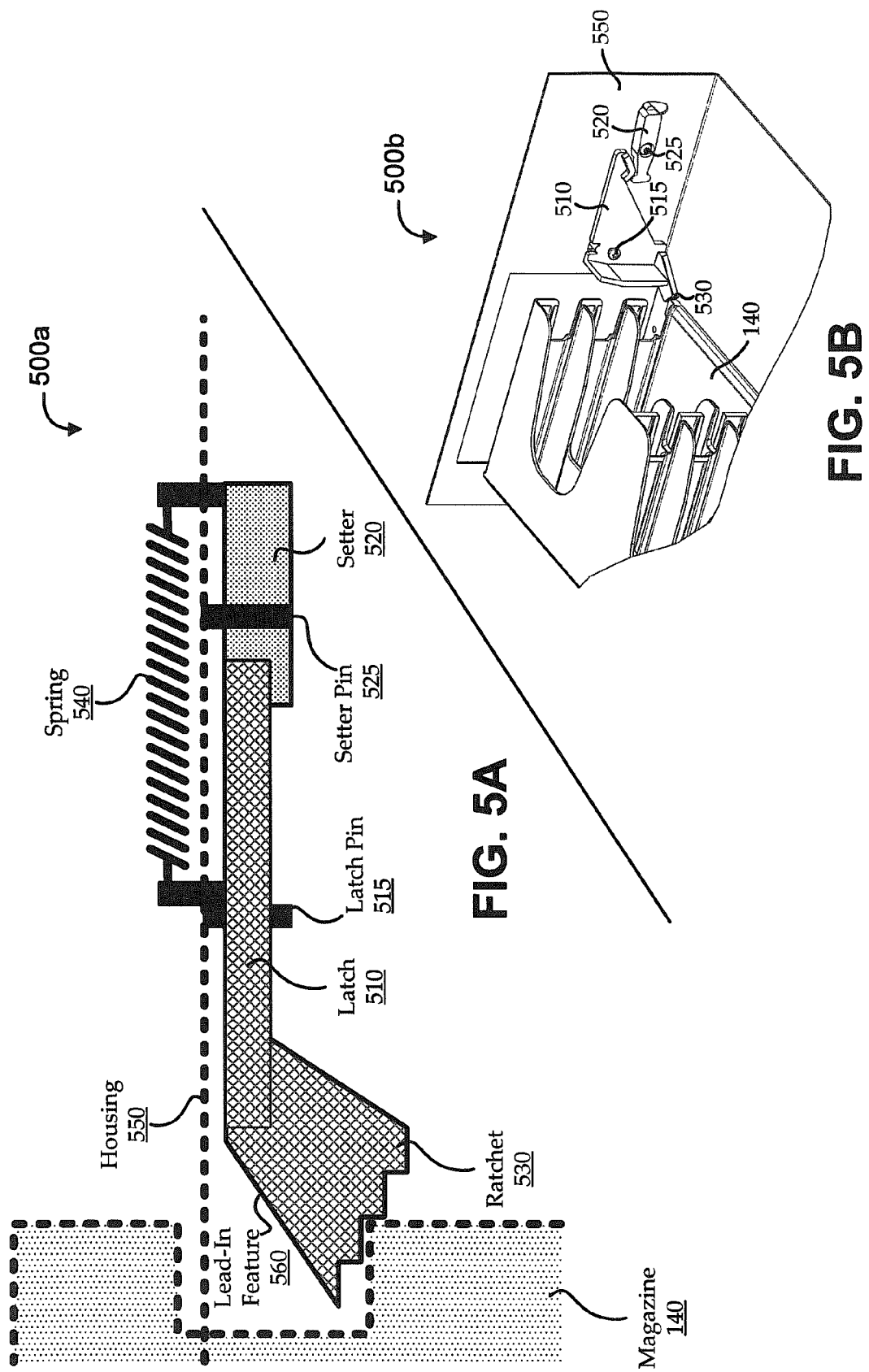

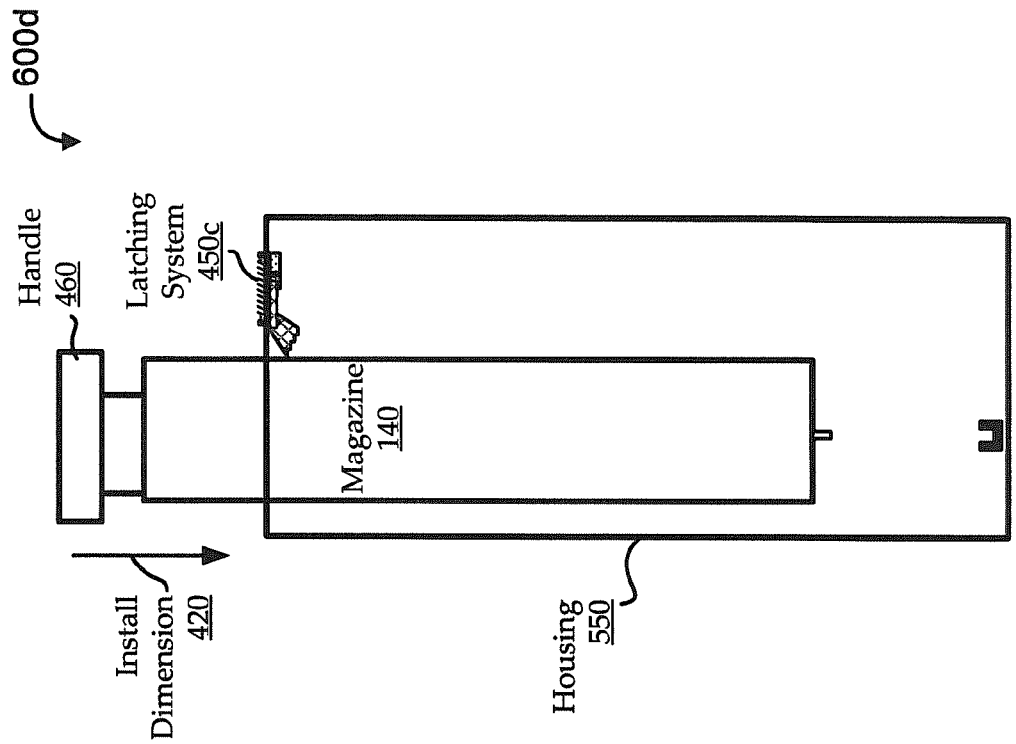
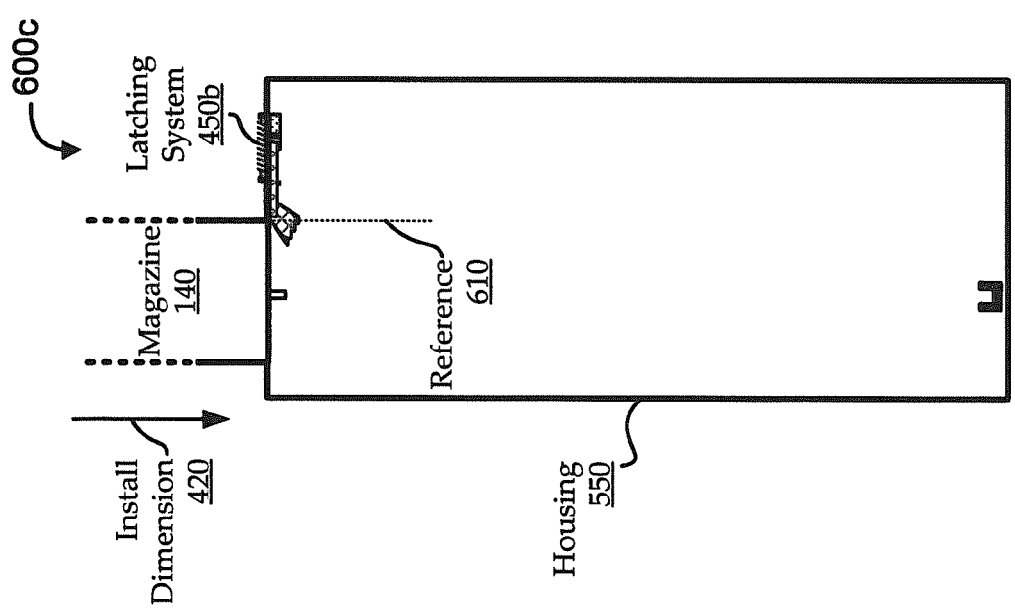

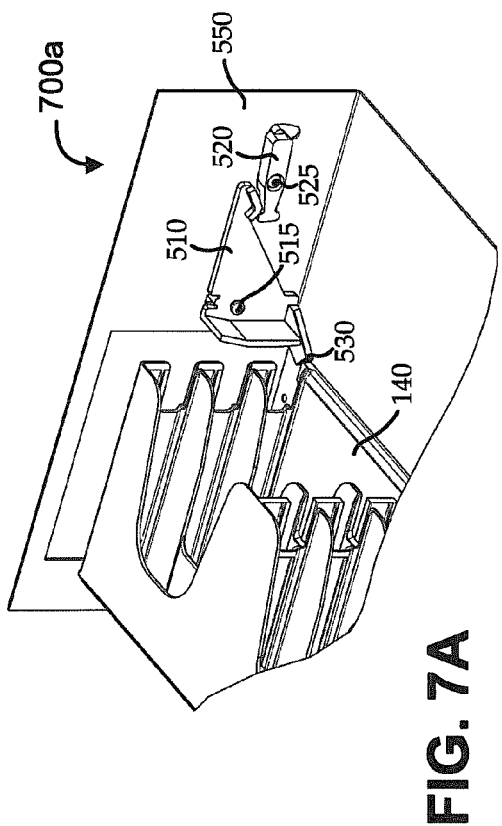
FIG. 7A
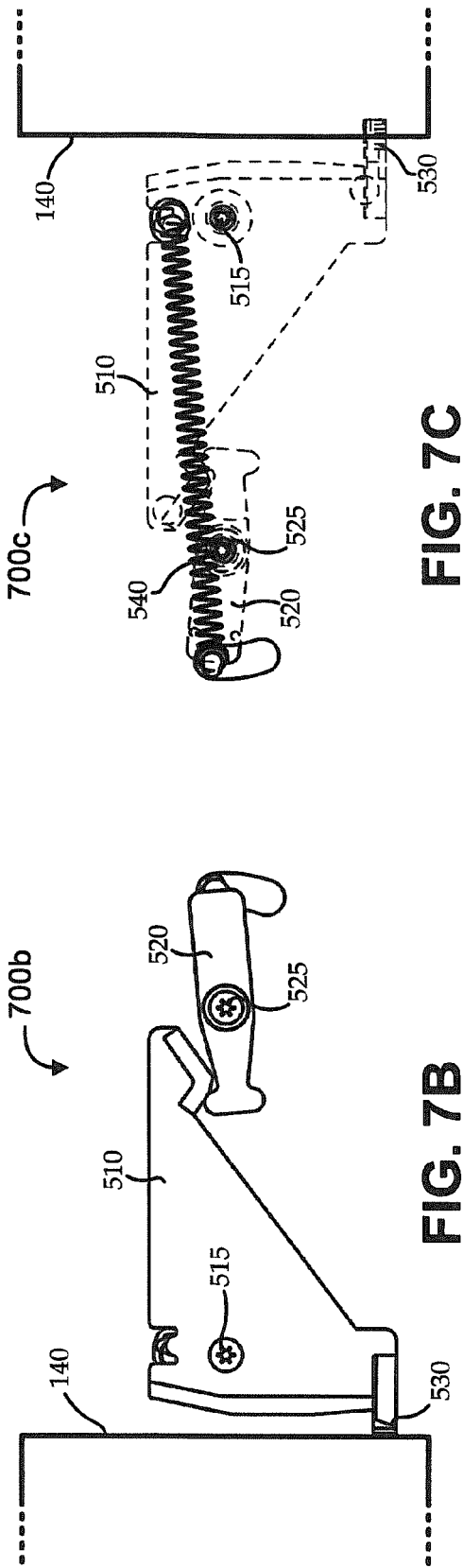
FIG. 7C
FIG. 7B

MAGAZINE LATCH FOR A STORAGE LIBRARY

FIELD

Embodiments relate generally to data storage systems, and, more particularly, to cartridge magazines for use in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

Some implementations of storage libraries include removable magazines. For example, a magazine can be removed, filled with data cartridges, and re-installed in the library. Accordingly, it may be desirable for the library to provide a state in which the magazine is freely removable, while providing another state in which the magazine is securely installed. Ensuring proper functioning of the storage library in this context may involve detecting when a magazine is installed or removed, whether the magazine is secured in an installed position, etc. It can be difficult to reliably provide these features, while accounting for cost, complexity, manufacturing tolerances, and/or other contextual constraints.

BRIEF SUMMARY

Among other things, embodiments provide novel systems and methods for securing a magazine in a housing a latching system. Embodiments operate in context of a storage library having removable magazines that store data cartridges. In one implementation, a floating, two-part latching system operates in either an operable state or an unlatched state. The latching system includes a setter and a latch, where the latch is configured to float on the setter and to be biased into a latched position. When the setter is in a first position, it permits the latch to float between at least a fully latched position and a fully unlatched position. When the setter is moved to a second position, it moves the latch into the fully unlatched position and restricts the latch from moving into the latched position. Embodiments of the latching system can operate so that, when the latching system is in its operable state, the magazine can be moved between uninstalled and partially installed positions substantially without interference from the latching system, but the magazine will automatically become secured in an installed position by the latching system when it is moved into that position. Some embodiments also include a ratcheting feature that is operable to secure the magazine in multiple valid installed positions.

According to one set of embodiments, a data storage system is provided that includes a housing, a magazine, a latch, and a setter. The magazine is operable to hold a number of data cartridges in a number of slots, and is installable in the housing by slidably engaging the magazine with the housing to position the magazine in an installed position with respect to the module. The latch is coupled with the housing and is operable to move along a path between a latched position and an unlatched position. The is also biased by a biasing force into the latched position and engageable with the magazine in such a way that the latch secures the magazine in the installed position when the latch is in the latched position and permits the magazine to be moved from the installed position when in the unlatched position. The setter is interfaceable with the latch in such a way that permits motion of the latch between the latched position and the unlatched position when the setter is in a first position, and moves the latch to the unlatched position and restricts motion of the latch from the unlatched position to the latched position when the setter is in a second position.

According to another set of embodiments, a latching system is provided. The system includes: a latch operable to move along a path between a latched position and an unlatched position, the latch being biased by a biasing force into the latched position; and a setter interfaceable with the latch in such a way that permits motion of the latch between the latched position and the unlatched position when the setter is in a first position, and moves the latch to the unlatched position and restricts motion of the latch from the unlatched position to the latched position when the setter is in a second position.

According to yet another set of embodiments, a method is provided for securing a magazine in a housing a latching system. The method includes: moving a setter of the latching system to a first position, the latching system comprising a latch operable to move along a path between a latched position and an unlatched position, the latch being biased by a biasing force into the latched position and engageable with the magazine in such a way that the latch secures the magazine in an installed position when the latch is in the latched position and permits the magazine to be moved from the installed position when in the unlatched position, the setter being operable to interface with the latch in such a way that moving the setter to the first position permits motion of the latch between the latched position and the unlatched position and moving the setter to a second position moves the latch to the unlatched position and restricts motion of the latch from the unlatched position to the latched position; first slidably receiving the magazine in a housing into a partially installed position in such a way as to cause the magazine to push and hold the latch out of the latched position; and second slidably receiving the magazine in the housing into a fully installed position in such a way as to permit the latch to move back into the latched position, thereby securing the magazine in the installed position.

BRIEF DESCRIPTION OF THE DRAWINGS

The present disclosure is described in conjunction with the appended figures:

FIGS. 3A and 3B show rear and front views, respectively, of an illustrative expansion module, according to various embodiments;

FIGS. 5A and 5B show a top view and a projection view of an illustrative latching system, respectively, according to various embodiments;

FIGS. 6A-6G show simplified top views of an illustrative sequence of installing a magazine into a housing, according to various embodiments;

FIGS. 7A-7C show three views of an illustrative latching system environment in a state similar to the one shown in FIG. 6F;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
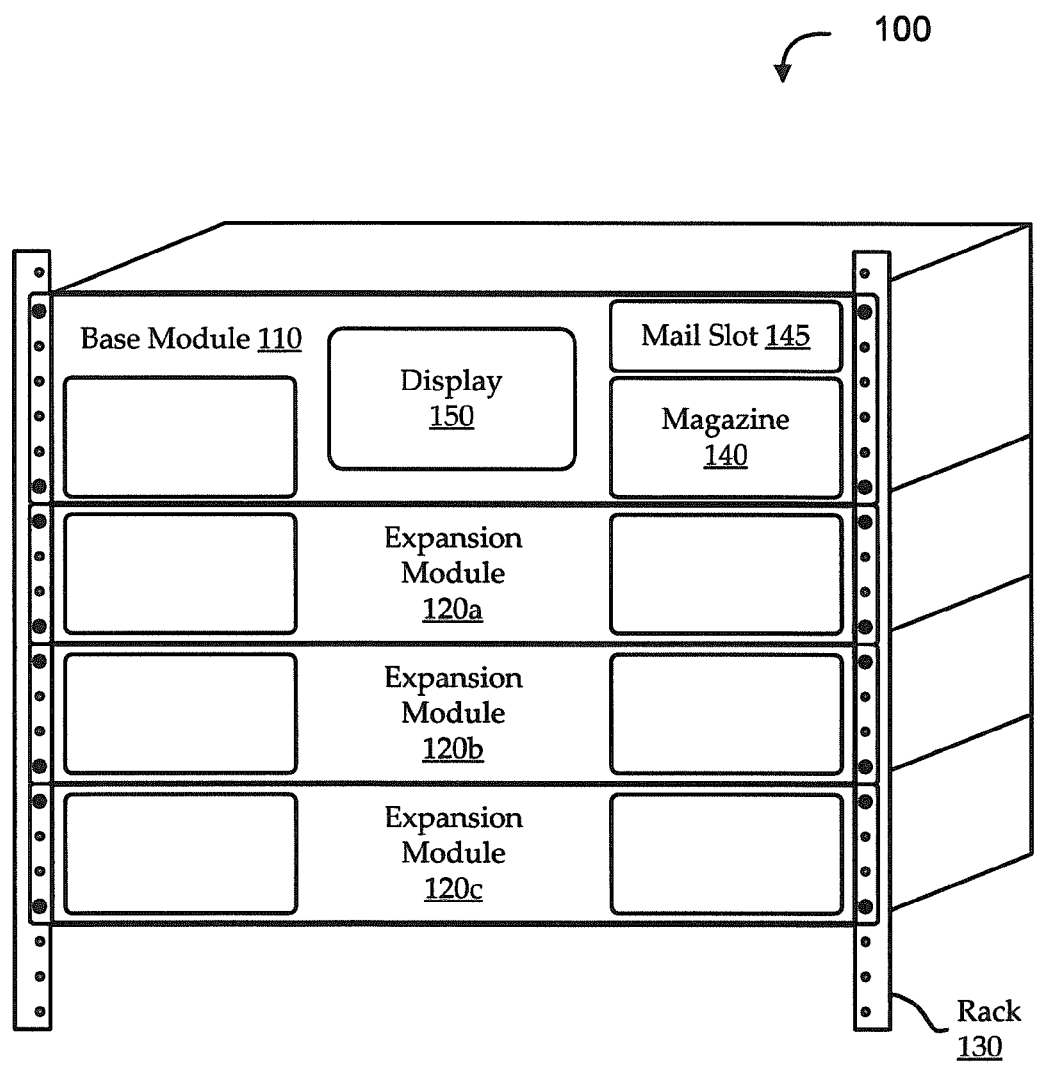
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

Figure 2A:
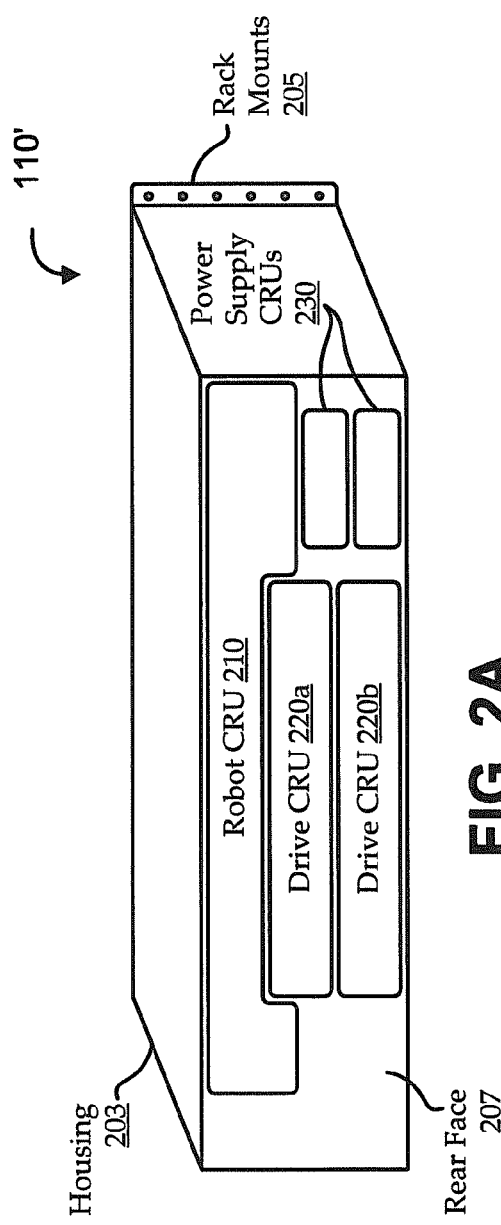
FIGS. 2A and 2B show rear and front views, respectively, of an illustrative base module, according to various embodiments.
Figure 2B:
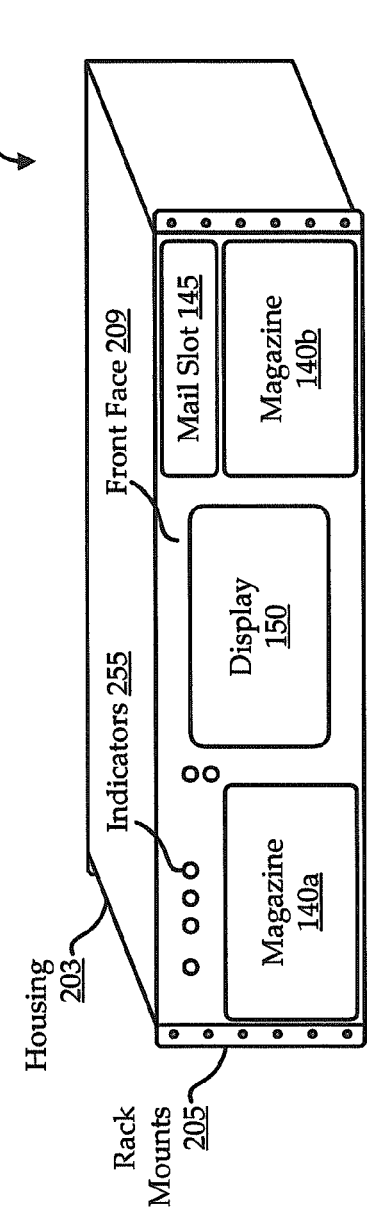

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touch-screen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("FE cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303 (e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Some implementations include removable magazines 140. For example, a magazine 140 can be removed, filled with data cartridges, and re-installed in the library. Embodiments described herein provide a novel magazine latching system that facilitates a number of features. According to some such features, the latching system interfaces with the robotic mechanism so the robotic mechanism can set the latching system either to a first state in which the magazine 140 is freely removable from the library or to a second state in which the magazine is securely installed in the library. According to other such features, the latching system is configured to allow reliable detection of at least when the magazine is installed or removed and whether the magazine is secured in an installed position. Some implementations provide these and other features in a manner that is relatively low in cost and complexity and capable of operating over a range of manufacturing tolerances.

Figure 4:
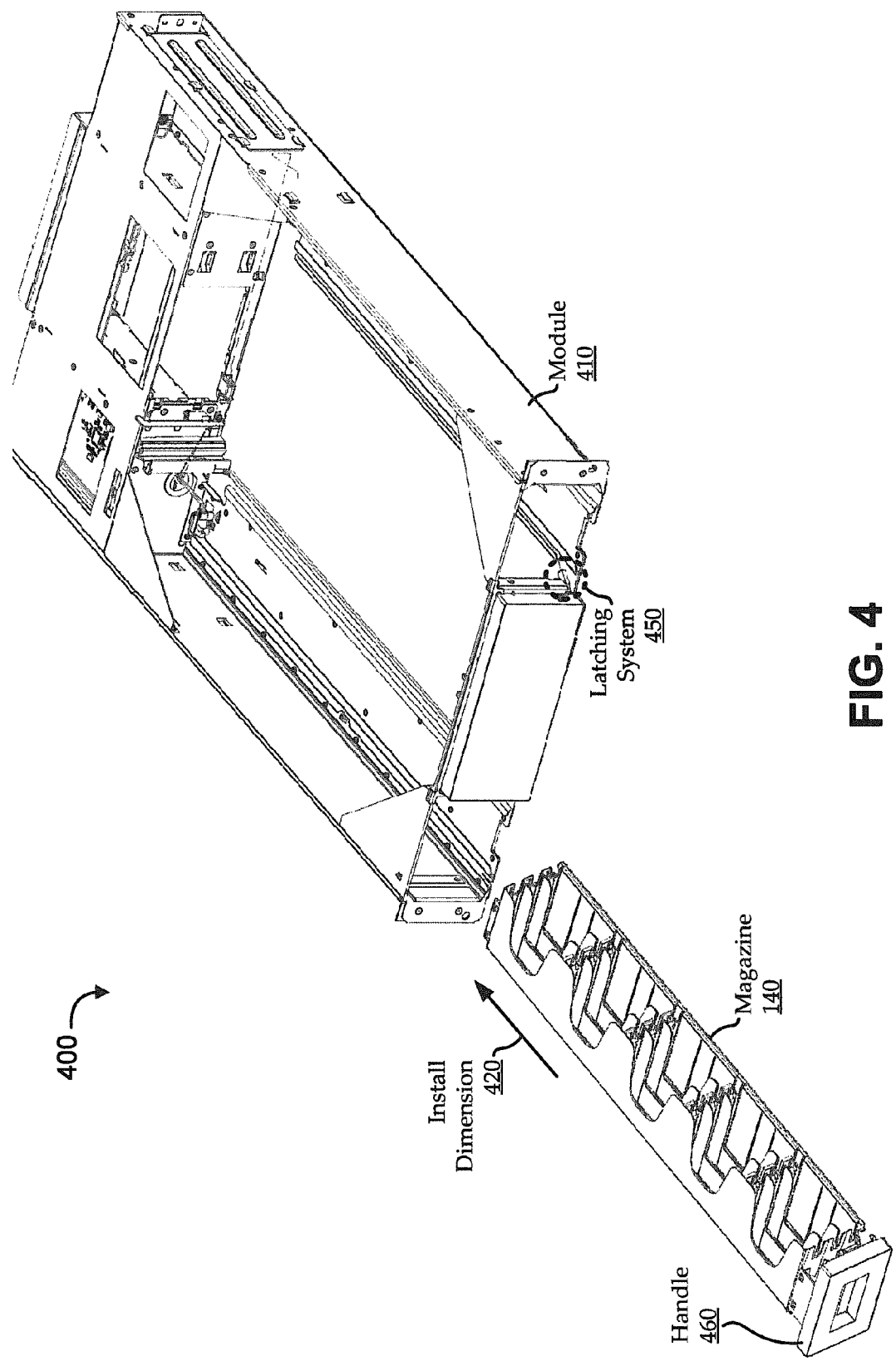
FIG. 4 shows an illustrative installation environment that includes a module (or "housing") and a magazine configured to be installed in the module, according to various embodiments.

Turning to FIG. 4, an illustrative installation environment 400 is shown that includes a module 410 (or "housing") and a magazine 140 configured to be installed in the module 410, according to various embodiments. The module 410 may be a base module 110, an expansion module 120, or the like. The module 410 is shown removed from the context of a larger data storage system for the sake of clarity. The module 410 may include one or more installation locations for receiving a magazine 140. For example, the module 410 illustrated is configured to receive two magazines 140.

As illustrated, the magazine 140 is configured to be installed (e.g., slidably engaged) in an installed dimension 420 into the module 410. The magazine 140 may include various types of hardware, including, for example, a handle 460 and various types of installation structures. In some implementations, the handle 460 can be used to slidably engage the magazine 140 with and/or disengage the magazine 140 from the module 410. As described above, the magazine 140 includes a number of slots for holding data storage cartridges. The module 410 is configured (e.g., sized, shaped, etc.) to facilitate use of the robotic mechanism (not shown) to install data storage cartridges in and/or remove data storage cartridges from the slots of the magazine 140.

Embodiments of the module 410 include one or more latching systems 450. Embodiments of the latching systems 450 are configured to operate in a latched state or in an unlatched state. In the latched state, the latching system 450 secures the magazine 140 in an installed position in the module 410. In the unlatched state, the latching system 450 allows the magazine 140 to be removed from the module 410. Embodiments of latching systems 450 will be described in more detail below.

FIGS. 5A and 5B show a top view 500a and a projection view 500b of an illustrative latching system, respectively, according to various embodiments. The illustrative latching system may be the latching system 450 of FIG. 4 and is shown in context of a magazine 140 and a housing 550 (e.g., a housing of a module). The illustrative latching system includes a latch 510 and a setter 520 configured to work in conjunction to provide various latching functionality. The latch 510 is operable to move along the path between at least a latched position and an unlatched position. The latch 510 is illustrated in a latched position. According to some embodiments, the latch 510 is biased by a biasing force into the latched position. For example, a spring 540 is coupled with the latch 510 in such a way as to bias the latch 510 into the latched position.

The setter 520 is configured to be set in either a first position or a second position. In the first position, the setter 520 interfaces with the latch 510 in such a way that permits motion of the latch 510 between the latched position and the unlatched position. Moving the setter 520 to the second position causes the latch 510 to be moved into the unlatched position and restricts motion of the latch 510 from the unlatched position to the latched position. Embodiments of the setter 520 are operable to be "set" in at least the first and second positions by a robotic mechanism. For example, a geometric protrusion on the robotic mechanism can be used to physically move the setter 520. In some implementations, such as the one shown, the setter 520 is operable to be moved to both positions by moving the robotic mechanism in the same direction. For example, the robotic mechanism may be implemented on a suspended platform that can be raised or lowered on cables in context of the storage library modules. It may be preferable in those implementations to use the robotic mechanism to move the setter 520 only in a "raising" (rather than a "lowering") direction. Accordingly, the setter 520 can be implemented on a pivot (e.g., around the setter pin 525), such that pulling up on one side of the setter 520 moves the setter 520 to a first position and pulling up on the other side of the setter moves the setter 520 to the second position.

As will be described more fully below, the interaction between the setter 520 in the latch 510 effectively facilitates operation of the latching system in either an "unlatched" or "operable" state. In the unlatched state, the setter 520 is in the second position and the latch 510 is in the unlatched position, so that the magazine 140 can be freely moved from an installed to and uninstalled (e.g., or partially installed) position. In the operable state, the setter 520 is in the first position, permitting the latch 510 to float between various positions. When the latching system is in the operable state, the magazine 140 can be freely moved to an installed position (e.g., from an uninstalled or partially installed position), but the magazine 140 cannot be moved out of the installed position.

As illustrated, embodiments of the latch 510 include a ratchet 530. The ratchet 530 effectively provides multiple positions in which a magazine 140 can be latched. For example, manufacturing tolerances and/or other factors may impact the position of a latching feature on the magazine 140. The ratchet 530 facilitates secure latching of the magazine 140 in the installed position over a range of manufacturing tolerances. Embodiments of the latch 510 also include a lead-in feature 560. The lead-in feature may include any suitable geometric (e.g., bevel, radius, slope, etc.), mechanical, electromechanical, magnetic, or other feature that allows the latch 510 to be pushed and/or held out of the way by the magazine 140 when the magazine is not in an installed position.

According to some embodiments, the latch 510 is coupled with the housing 550 via a fastener that allows the latch to move along the path between the latched and unlatched positions. For example, the latch 510 is coupled with the housing 550 using a latch pin 515 that forms an axis of rotation about which the latch 510 can follow in arcuate path between the latched and unlatched positions. Similarly, embodiments of the setter 520 are coupled with the housing 550 in such a way as to allow the setter 520 to move from the first position to the second position. For example, the setter 520 is coupled with the housing 550 using a setter pin 525 that forms an axis of rotation about which the setter 520 can follow in arcuate path between the first position and the second position.

Certain functionality exploits a two-part, floating configuration of the latching system. In some implementations, the latch 510 is not coupled with the setter 520, though the biasing force causes the latch 510 to normally rest on the setter 520 (i.e., when other forces on the latch do not exceed the biasing force). For example, the spring 540 can be coupled with the latch 510 and the setter 520 in an "over-center" configuration. In that configuration, the spring 540 creates the biasing force that effectively holds the latch 510 resting on the setter 520, while allowing the latch 510 to be moved substantially opposite the biasing direction. For example, the setter 520 can be moved to its first position (i.e., so that the latch 510 is set to its operable state) when the magazine 140 is at any position with respect to the module. If the magazine 140 is in a fully installed position, the latch 510 will operate to secure the magazine 140 in place; if the magazine is in any other configuration, the latch will float out of the way of the magazine 140 as needed to allow the magazine to be installed into or removed from the module.

FIGS. 6A-6G show simplified top views 600 of an illustrative sequence of installing a magazine 140 into a housing 550, according to various embodiments. The illustrative sequence is intended only as a context to provide further clarity in describing various features of embodiments. In particular, the sequence illustrates the unlatched an operative states of an embodiment of the latching system as it impacts magazine 140 installation in a housing 550.

Figure 6B:
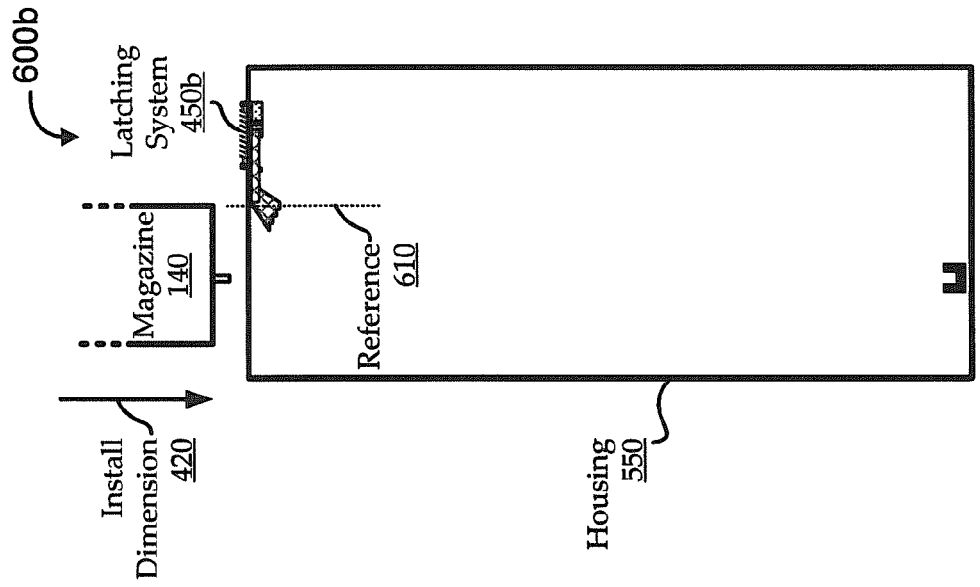
Figure 6A:
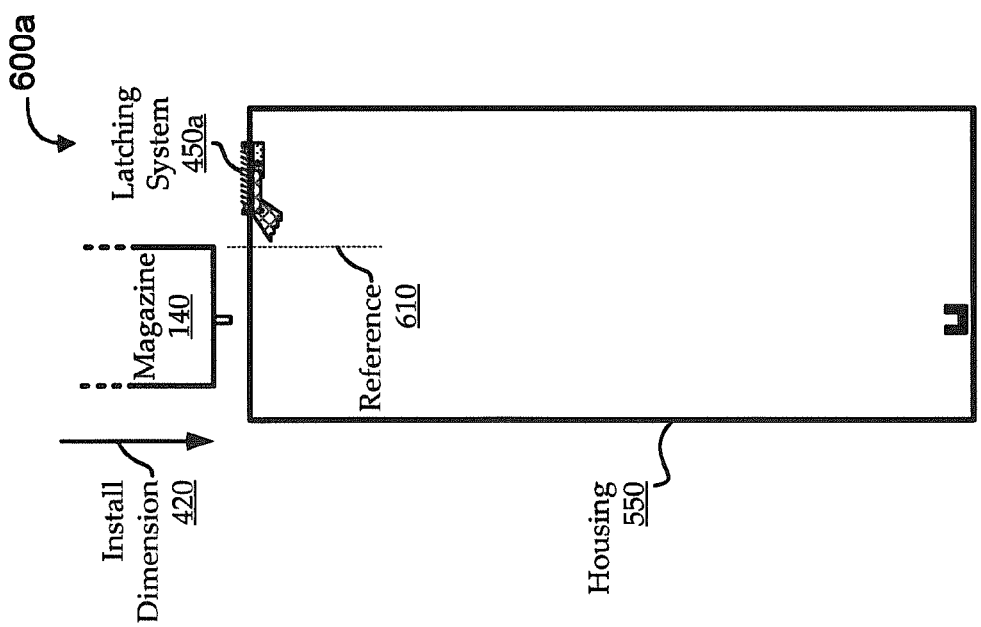

Turning first to FIG. 6A, a top view 600a is shown of a magazine 140 in an uninstalled position relative to a housing 550. The housing includes a latching system 450 that is shown in its unlatched state (i.e., illustrated as latching system 450a). As illustrated, the magazine 140 is installed in the housing 550 in an install direction 420. A reference line 610 is provided to show where the edge of the magazine 140 closest to the latching system 450a (the "latch-side" edge) would be if the magazine 140 were installed in the housing 550 the latching system 450a in its unlatched state.

FIG. 6B shows a top view 600b that is the same as the top view 600a of FIG. 6A, except that the latching system 450 is shown in the operable state and biased into a fully latched position (i.e., illustrated as latching system 450b). Reference line 610 indicates that the latch-side edge of the magazine 140 would collide with the latch of the latching system 450b if the magazine 141 installed in the housing 550 with the latching system 450b in the fully latched position.

FIG. 6C shows a top view 600c that is the same as the top view 600b of FIG. 6B, except that the magazine 140 has been moved in the installed dimension 420 to a first partially installed position. With the magazine 140 in the first partially installed position, the latch-side edge of the magazine 140 is colliding with the latch of the latching system 450b. As described above, the latch includes a lead-in feature operable to translate movement of the magazine in the installed dimension 420 into a force that pushes the latch out of the way of the magazine 140 during installation. For example, the latch rests in a floating manner on the setter with the latch biased toward the latched position and the setter in the first position, as described with reference to FIGS. 5A and 5B. As the magazine 140 is slid into the housing 550 it contacts the lead-in feature of the latch and pushes the latch out of the fully latched position to allow the magazine 142 slide past.

FIG. 6D shows a top view 600d that is the same as the top view 600c of FIG. 6C, except that the magazine 140 has been installed further (i.e., moved to a second partially installed position) and has pushed the latching system 450 fully out of the way. The handle 460 of the magazine 140 is also shown for context. In this configuration, the latching system 450 is still in the operable state, though it is in a floating position somewhere between the latched and unlatched positions (i.e., illustrated as latching system 450c). For example, referring to FIGS. 5A and 5B, the setter is in its first position, in the portion of the latch that would normally rest on the setter is raised above the setter (e.g., increasing tension in the spring). Notably, with the latching system 450c in this position, the magazine 140 can be relatively easily moved over a large range of partially installed positions.

Figure 6G:
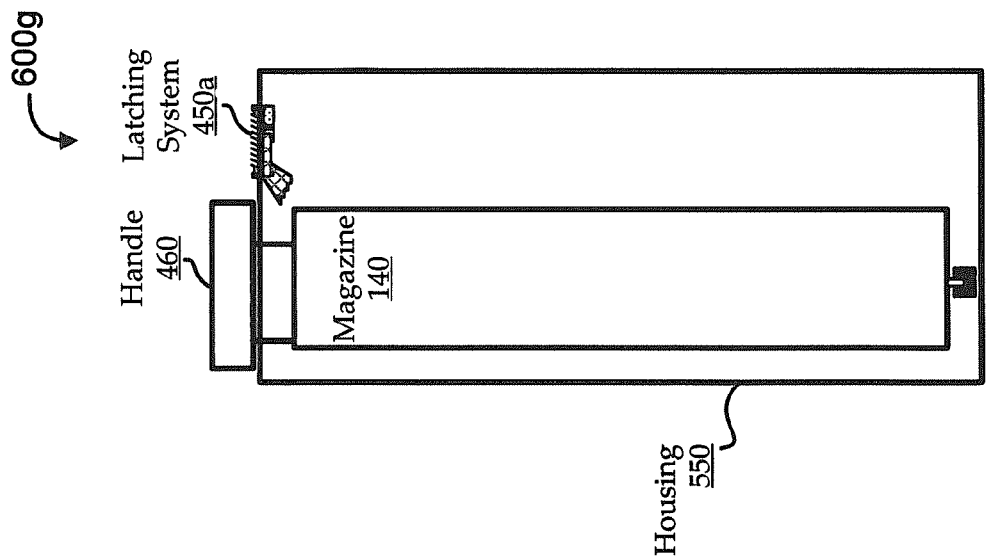
Figure 6F:
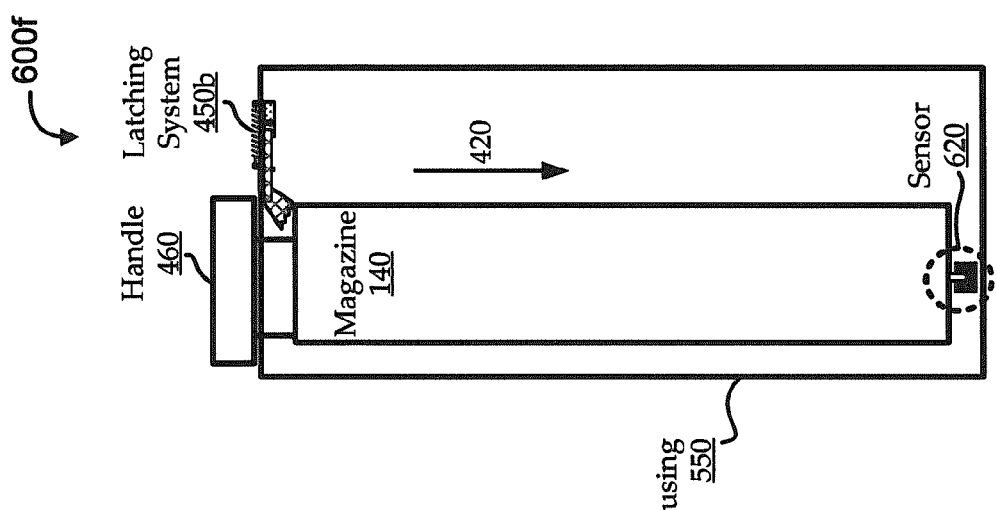
Figure 6E:
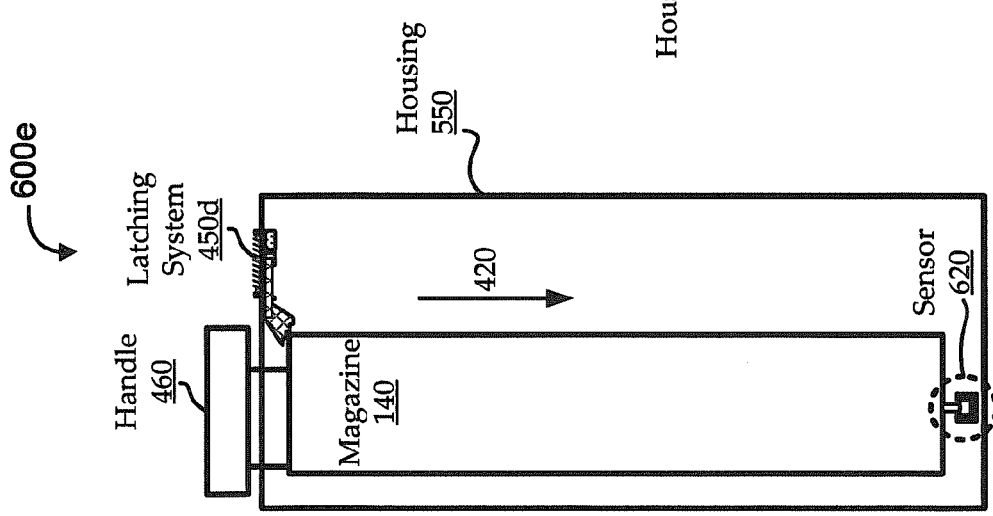

FIG. 6E shows a top view 600e that is similar to those of FIGS. 6A-6D. According to FIG. 6E, the magazine 140 is in a first fully installed position in the housing 550. For example, the magazine 140 has been slid in the install dimension 420 from its uninstalled position (e.g., of FIGS. 6A and 6B) to the first partially installed position (e.g., of FIG. 6C) to the second partially installed position (e.g., a FIG. 6D) to the first fully installed position shown in FIG. 6E. The latch system 450 is still in its operable state. However, once the magazine 140 has passed a certain location relative to the latching system 450, the latch-side edge of the magazine 140 is no longer pushing on latching system 450, and the biasing force pushes the latching system 450 back into a latched position. As described above, the latching system 450 can include a ratchet to accommodate for a range of valid installed positions of a magazine 140 (e.g., or a variety of manufacturing tolerances in lengths of magazines 140, etc.). For example, the magazine 140 can be secured in the first fully installed position with the latching system 450 in a first latched position (i.e., illustrated as latching system 450d).

In some embodiments, the magazine 140 can be considered "installed" when detected as such by a sensor 620. The sensor 620 is shown in a highly simplified manner that is intended to broadly represent any suitable type of sensor for detecting whether the magazine 140 is in a valid installed position. In some implementations, the sensor 620 is an optical sensor that can sense when an optical beam is interrupted by a geometric protrusion of the magazine 140 when the magazine is in a valid installed position. Notably, this type of sensor 620 can operate over a range of manufacturing tolerances. For example, the sensor 620 can be configured to detect the presence of the magazine feature, even if the magazine 140 were slightly longer or slightly shorter.

FIG. 6F shows a top view 600f that is similar to the top view 600e of FIG. 6B, except that the magazine 140 is even further installed into the housing 550. For example, the magazine 140 has been slid further in the install dimension 420 to a second fully installed position. In the second fully installed position, the sensor 620 still detects the magazine 140 as fully installed, though the latching system 450 is no longer in contact at all with the latch-side edge of the magazine 140. The latching system 450 is still in its operable state and is now free to be biased into a fully latched position. The latching system 450 may effectively be in the same position as when the magazine 140 was in an uninstalled position in FIG. 6B (i.e., the latching system 450 is illustrated as latching system 450b in both FIGS. 6F and 6B). Notably, the magazine 140 can be considered fully installed and can be fully secured by the latching system 450 whether it is in the first fully installed position of FIG. 6E or the second fully installed position of FIG. 6F.

For added clarity, FIGS. 7A-7C show three views 700 of an illustrative latching system environment in a state similar to the one shown in FIG. 6F. The latching system includes a latched 510 and a setter 520, each coupled with a housing 550 via a latch pin 515 and a setter pin 525, respectively. The setter 520 is in its first position, and the latch 510 is biased by the force of the spring 540 into a fully latched position. In the fully latched position, the ratchet 530 of the latch 510 is engaged with the magazine 140 in such a way that secures the magazine 140 in a fully installed position.

Turning back to FIG. 6G, a top view 600g is shown that is the same as the top view 600f of FIG. 6F, except that the latching system 450 is set to its unlatched state. For example, without moving the magazine 140 from its fully installed position in FIG. 6F, a robotic mechanism is used to move the setter of the latching system 450 to its second position, thereby moving the latch of the latching system 452 its unlatched position. The latching system 450 may effectively be in the same position as when the magazine 140 was in an uninstalled position in FIG. 6A (i.e., the latching system 450 is illustrated as latching system 450a in both FIGS. 6G and 6A). With the latching system 450a in the unlatched state, the magazine 140 is free to be removed partially or fully from the housing 550.

Figure 8A:
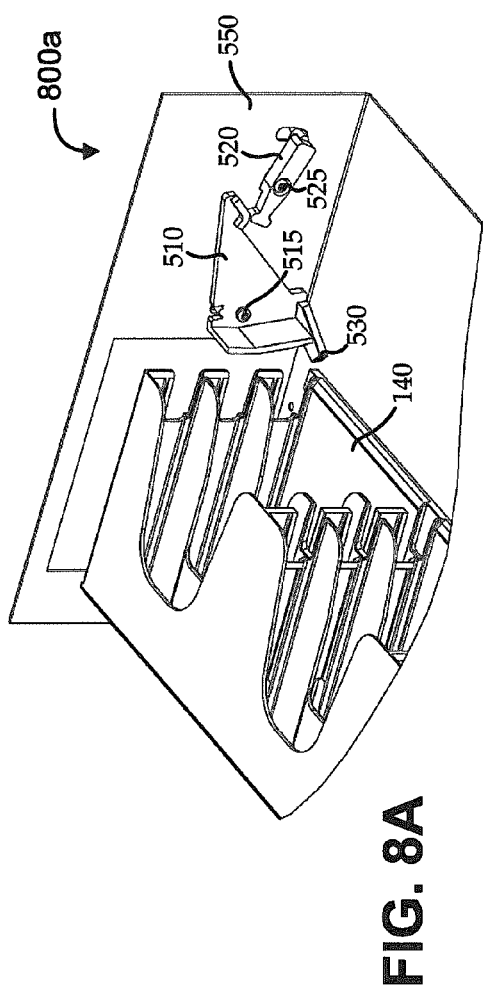
FIGS. 8A-8C show three views of an illustrative latching system environment in a state similar to the one shown in FIG. 6G.
Figure 8C:
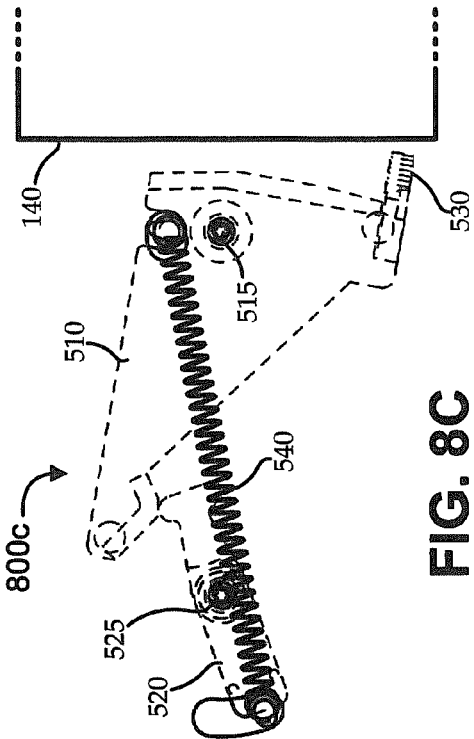
Figure 8B:
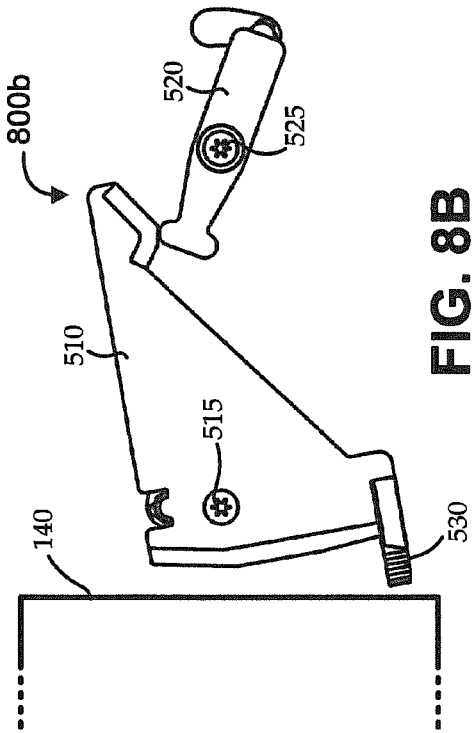

For added clarity, FIGS. 8A-8C show three views 800 of an illustrative latching system environment in a state similar to the one shown in FIG. 6G. The latching system includes a latched 510 and a setter 520, each coupled with a housing 550 via a latch pin 515 and a setter pin 525, respectively. The setter 520 is in its second position, thereby holding the latch 510 in an unlatched position. In the unlatched position, the latch 510 is moved fully out of the way of the magazine 140, thereby allowing the magazine 140 to be moved with respect to the housing 550 without interference from the latch 510.

It will be appreciated that the floating configuration of the two-part latching system 450 provides a number of features. One such feature is that the latching system 450 is operable to secure the magazine 140 in a number of valid installed positions. Another such feature is that the latching system 450 can be left in its operable state whenever the magazine 140 is not in a valid installed position without substantially interfering with movement of the magazine 140 with respect to the housing 550.

For example, suppose a user directs the storage library to unlatch the magazine 140. In response to the request, a robotic mechanism moves the setter into the second position thereby moving the latch into the unlatched position (from the state illustrated in FIG. 6F to the state illustrated in FIG. 6G). After some timeout window (e.g., one hour), the latching system is automatically returned to its operable state (i.e., without directing the storage library to re-latch the magazine 140). During the timeout window, a number of scenarios may have transpired. According to a first scenario, the user did not change the position of the magazine 140. At the end of the timeout window, the latching system 450 automatically returns to its operable state, and the state of the storage library effectively reverts from the state illustrated in FIG. 6G to the state illustrated in FIG. 6F. Similarly, according to a second scenario, the user removes and reinstalls the magazine 140 during the timeout window. As in the first scenario, the position of the magazine 140 at the end of the timeout window has not substantially changed from the position of the magazine 140 at the beginning of the timeout window. Again, at the end of the timeout window, the latching system 450 automatically returns to its operable state, and the state of the storage library effectively reverts from the state in FIG. 6G to the state in FIG. 6F. According to a third scenario, the user partially or completely removes the magazine 140 from the housing 550 (i.e., to a partially installed or uninstalled position). At the end of the timeout window, the latching system 450 automatically returns to its operable state, and the state of the storage library effectively transitions from the state illustrated in FIG. 6G to the state illustrated in FIG. 6D or FIG. 6B, respectively. In this state, as described above, the latching system 450 does not substantially interfere with movement of the magazine 140 while the magazine remains in a partially installed or fully uninstalled position with respect to the housing 550. However, the latching system 450 will secure the magazine 140 if it is moved into an installed position.

Notably, in each of the second and third scenarios, the magazine 140 has been removed from the installed position. Removal of the magazine 140 from the installed position can be detected by embodiments of the sensor 620 or in other ways. It may be desirable to perform this detection, at least because data cartridges may have been installed, removed, or reorganized in the slots of the magazine 140 while the magazine was not installed. For example, detection of removal of the magazine 140 from the installed position can trigger the storage library to audit the contents of the magazine.

While the above scenarios assume that the latching system 450 automatically returns to its operable state after some timeout window, the latching system 450 may be configured to change states in other ways. In some implementations, the latching system 450 only changes state when directed to do so explicitly (e.g., by user). For example, after a user directs the storage library to unlatch the latching system 450 corresponding to a particular magazine 140, the latching system 450 remains in its unlatched state until the user (or another user) directs the storage library to re-latch the latching system 450 corresponding to the particular magazine number 140. In other implementations, the latching system 450 only changes state when one or more trigger events are detected. For example, after a user directs the storage library to unlatch the latching system 450 corresponding to a particular magazine 140, the latching system 450 remains in its unlatched state until the sensor 620 detects that the magazine 140 has been moved from the installed position. Upon detecting that the magazine 140 is no longer in a valid installed position, the latching system 450 automatically returns to its operable state.

It will be appreciated that the embodiments shown in FIGS. 4-8C illustrate only some of many implementations of latching systems and coordinating components for providing the functionality described herein. For example, different shapes, sizes, interfaces, etc. may be used for different configurations of magazines, housings, etc. Further, additional components can be used to provide further sensing and/or other functionality. The embodiments described above and/or other embodiments can be used to provide various functionality of the methods described below, and the method embodiments described below can be performed using system embodiments (e.g., latching systems) other than those described above.

Figure 9:
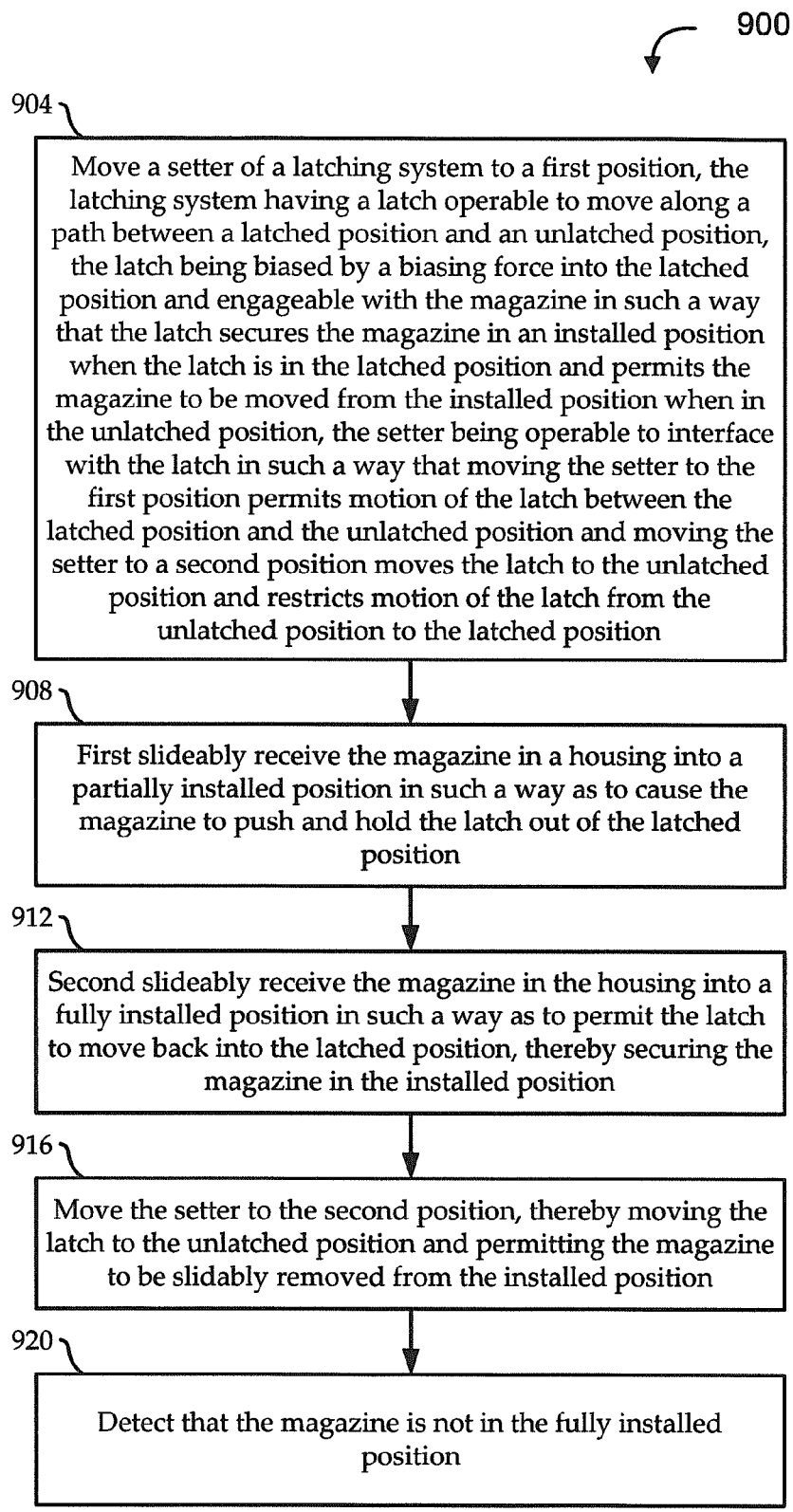
FIG. 9 shows a flow diagram of an illustrative method for securing a magazine in a housing a latching system, according to various embodiments.

Turning to FIG. 9, a flow diagram is shown of an illustrative method 900 for securing a magazine in a housing a latching system, according to various embodiments. Embodiments of the method 900 again at stage 904 by moving a setter of a latching system into a first position. The latching system has a latch operable to move along the path between a latched position in an unlatched position, and the latch is biased by a biasing force into the latched position. The latch is also engageable with the magazine in such a way that the latch secures the magazine in an installed position when the latch is in the latched position and permits the magazine to be moved from the installed position when the latch is in the unlatched position. The setter is operable to interface with the latch in such a way that moving the setter to the first position permits motion of the latch between the latched position in the unlatched position, and moving the setter to a second position moves the latch to the unlatched position and restricts motion of the latch from the unlatched position to the latched position. For example, as described above, moving the setter to the first position places the latching system in an operable state, and moving the setter to the second position places the latching system in an unlatched state.

At stage 908, the magazine is first slidably received in a housing into a partially installed position. Moving the magazine into this position causes the latch to be pushed and held out of the latched position. For example, moving the magazine from an uninstalled position to a partially installed position may transition the latch from a configuration similar to that shown in FIG. 6B to one similar to that shown in FIG. 6D. As described above, embodiments of the latch include a lead-in feature. Moving the magazine into a first partially installed position causes the magazine to contact the lead-in feature, and further moving the magazine into a second partially installed position causes the magazine to push on the lead-in feature in such a way that moves the latch out of the latched position and out of the way of the magazine.

At stage 912 the magazine is second slidably received in the housing into a fully installed position. Moving the magazine into this position permits the latch to move under the biasing force back into the latched position, thereby securing the magazine in the installed position. For example, moving the magazine from the partially installed position to the fully installed position may transition the latch from a configuration similar to that shown in FIG. 6D to one similar to that shown in FIG. 6F. As described above, embodiments of the latch include a ratchet feature. The magazine can be moved into a first installed position in which the ratchet feature secures the magazine with the latch in a first latched position. The magazine can be further moved into a second installed position (e.g., slid further into the housing) in which the ratchet feature secures the magazine with the latch in a second latched position. For example, moving the magazine from the first installed position to the second installed position may transition the latch from a configuration similar to that shown in FIG. 6E to one similar to that shown in FIG. 6F.

At stage 916, the setter is moved to the second position. As described above, moving the setter to the second position causes the latch to be moved to its unlatched position, such that the magazine is permitted to be slidably removed from its installed position (e.g., from the housing). For example, moving the setter from the first position to the second position may transition the latch from a configuration similar to that shown in FIG. 6F to one similar to that shown in FIG. 6G. Some embodiments detect whether the magazine is in the installed position. Accordingly, at stage 920, embodiments detect that the magazine is not in the fully installed position. Various actions can be taken in response to this detection. For example, in response to detecting that the magazine is not in the fully installed position, the setter may be returned to the first position, an audit of the magazine contents may be triggered, etc.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A data storage system comprising:
a housing;
a magazine operable to hold a plurality of data cartridges in a plurality of slots, the magazine being installable in the housing by slidably engaging the magazine with the housing to position the magazine in an installed position with respect to the module;
a latch coupled with the housing and operable to move along a path between a latched position and an unlatched position, the latch being biased by a biasing force into the latched position and engageable with the magazine in such a way that the latch secures the magazine in the installed position when the latch is in the latched position and permits the magazine to be moved from the installed position when in the unlatched position; and
a setter interfaceable with the latch in such a way that permits motion of the latch between the latched position and the unlatched position when the setter is in a first position, and moves the latch to the unlatched position and restricts motion of the latch from the unlatched position to the latched position when the setter is in a second position.

2. The data storage system of claim 1, wherein:
the latch is further engageable with the magazine in such a way that the latch is held out of the latched position by the magazine when the magazine is in a partially installed position and the setter is in the first position.

3. The data storage system of claim 1, wherein:
the latch comprises a lead-in feature engageable with the magazine in such a way that slidably engaging the magazine with the housing when the latch is in the latched position causes the magazine to contact the lead-in feature thereby pushing the latch out of the latched position.

4. The data storage system of claim 1, wherein:
the installed position is a range of installed positions accounting for a predetermined tolerance comprising a first installed position and a second installed position in which the magazine is further slidably engaged with the housing than in the first installed position;
the latched position is a range of latched positions accounting for the predetermined tolerance comprising a first latched position and a second latched position; and
the latch comprises a ratchet feature engageable with the magazine in such a way that the ratchet feature secures the magazine in the first installed position with the latch in the first latched position, and the ratchet feature secures the magazine in the second installed position with the latch in the second latched position.

5. The data storage system of claim 4, further comprising:
a sensor having a detection range such that the sensor is operable to detect that the magazine is installed when the magazine is in any of the range of installed positions, wherein the predetermined tolerance is determined according to the detection range.

6. The data storage system of claim 1, further comprising:
a robotic mechanism operable to install the data cartridges in and remove the data cartridges from the plurality of slots of the magazine and to move the setter between the first position and the second position.

7. The data storage system of claim 1, wherein the latch is rotatably coupled with the housing and operable to move along an arcuate path between the latched position and the unlatched position.

8. The data storage system of claim 1, wherein the setter is coupled with the housing, and the setter is interfaceable with the latch in such a way that the latch normally rests on the setter.

9. A latching system for securing a magazine, the latching system comprising:
a latch operable to move along a path between a latched position and an unlatched position, the latch being biased by a biasing force into the latched position; and
a setter interfaceable with the latch in such a way that permits motion of the latch between the latched position and the unlatched position when the setter is in a first position, and moves the latch to the unlatched position and restricts motion of the latch from the unlatched position to the latched position when the setter is in a second position.

10. The latching system of claim 9, wherein:
the latch is coupled with a housing; and
the latch comprises a lead-in feature engageable with the magazine in such a way that installing the magazine in the housing when the latch is in the latched position causes the magazine to contact the lead-in feature thereby pushing the latch out of the latched position.

11. The latching system of claim 9, wherein:
the latched position is one of a plurality of latched positions;
the installed position is one of a plurality of installed positions; and
the latch comprises a ratchet feature engageable with the magazine in such a way that the ratchet feature secures the magazine in a first installed position with the latch in a first latched position, and the ratchet feature secures the magazine in a second installed position with the latch in a second latched position.

12. The latching system of claim 9, further comprising:
a spring coupled with the latch in an over-center configuration to exert the biasing force to bias the latch into the latched position.

13. The latching system of claim 9, further comprising:
a spring coupled between the latch and the setter, wherein:
each of the latch and the setter is rotatably coupled with a housing;
the setter is interfaceable with the latch in such a way that the latch rests on the setter; and
each of the latch and the setter is coupled with the spring in an over-center configuration to exert the biasing force in such a way that holds the latch resting on the setter.

14. A method for securing a magazine in a housing a latching system, the method comprising:

moving a setter of the latching system to a first position, the latching system comprising a latch operable to move along a path between a latched position and an unlatched position, the latch being biased by a biasing force into the latched position and engageable with the magazine in such a way that the latch secures the magazine in an installed position when the latch is in the latched position and permits the magazine to be moved from the installed position when in the unlatched position, the setter being operable to interface with the latch in such a way that moving the setter to the first position permits motion of the latch between the latched position and the unlatched position and moving the setter to a second position moves the latch to the unlatched position and restricts motion of the latch from the unlatched position to the latched position;

first slidably receiving the magazine in a housing into a partially installed position in such a way as to cause the magazine to push and hold the latch out of the latched position;

second slidably receiving the magazine in the housing into a fully installed position in such a way as to permit the latch to move back into the latched position, thereby securing the magazine in the installed position.

15. The method of claim 14, wherein:

the latch is coupled with the housing and comprises a lead-in feature; and first slidably receiving the magazine in the housing into the partially installed position comprises slidably receiving the magazine from an uninstalled position to the partially installed position in such a way that causes the magazine to push on the lead-in feature, thereby pushing the latch out of the latched position against the biasing force.

16. The method of claim 14, wherein:

the latch comprises a ratchet feature; and second slidably receiving the magazine in the housing into the fully installed position comprises:

slidably receiving the magazine into the housing to a first installed position in which the ratchet feature secures the magazine with the latch in a first latched position; and slidably receiving the magazine further into the housing to a second installed position in which the ratchet feature secures the magazine with the latch in a second latched position, the second installed position being the fully installed position.

17. The method of claim 14, further comprising:

moving the setter to the second position subsequent to the second slidably receiving step, thereby moving the latch to the unlatched position and permitting the magazine to be slidably moved from the installed position.

18. The method of claim 17, further comprising:

detecting that the magazine is not in the fully installed position; and moving the setter to the first position in response to the detecting.

19. The method of claim 14, wherein:

moving the setter of the latching system to the first position comprises using a robotic mechanism to push the setter to the first position, the robotic mechanism being operable to install data cartridges in and remove the data cartridges from slots of the magazine.

20. The method of claim 14, wherein:

the setter is operable to rotate about an axis;

moving the setter to the first position comprises moving a robotic mechanism in a first dimension to push the setter to the first position, the first dimension being substantially orthogonal to the axis; and moving the setter to the second position comprises moving the robotic mechanism in the first dimension to push the setter to the second position.

* * * * *

UNITED STATES PATENT AND TRADEMARK OFFICE
CERTIFICATE OF CORRECTION

| | | |
|---|---|---|
| PATENT NO. | : 8,705,200 B2 | Page 1 of 1 |
| APPLICATION NO. | : 13/482809 | |
| DATED | : April 22, 2014 | |
| INVENTOR(S) | : Manes et al. | |

It is certified that error appears in the above-identified patent and that said Letters Patent is hereby corrected as shown below:

In the Specification:

In column 1, line 39, after "housing" insert -- using --.

In column 2, line 26, after "housing" insert -- using --.

In column 3, line 14, after "housing" insert -- using --.

In column 5, line 9, delete "and or" and insert -- and/or --, therefor.

In column 6, line 2, delete "and or" and insert -- and/or --, therefor.

In column 12, line 67, after "housing" insert -- using --.

In the Claims:

In column 16, line 66, in Claim 14, after "housing" insert -- using --.

Signed and Sealed this
Second Day of September, 2014

Michelle K. Lee
*Deputy Director of the United States Patent and Trademark Office*